(12) United States Patent
Xu

(10) Patent No.: US 11,744,354 B2
(45) Date of Patent: Sep. 5, 2023

(54) HANDLE SLIDING STRUCTURE AND SELFIE STICK USING SAME

(71) Applicant: SHENZHEN YUANSU CHUANGDA TECHNOLOGY CO., LTD, Shenzhen (CN)

(72) Inventor: Xibin Xu, Shenzhen (CN)

(73) Assignee: SHENZHEN YUANSU CHUANGDA TECHNOLOGY CO., LTD, Shenzhen (CN)

( * ) Notice: Subject to any disclaimer, the term of this patent is extended or adjusted under 35 U.S.C. 154(b) by 282 days.

(21) Appl. No.: 17/167,030

(22) Filed: Feb. 3, 2021

(65) Prior Publication Data
US 2021/0368970 A1    Dec. 2, 2021

(30) Foreign Application Priority Data

May 27, 2020   (CN) ......................... 202020929495.7

(51) Int. Cl.
| | | |
|---|---|---|
| *B25G 1/04* | (2006.01) | |
| *F16M 13/04* | (2006.01) | |
| *A45F 5/10* | (2006.01) | |

(52) U.S. Cl.
CPC ............. *A45F 5/102* (2013.01); *B25G 1/04* (2013.01); *F16M 13/04* (2013.01); *A45F 2005/1066* (2013.01); *A45F 2200/0516* (2013.01)

(58) Field of Classification Search
CPC ..... B25J 1/02; B25J 1/04; A47F 13/06; A45F 5/102; A45F 2200/0516; B25G 1/04; F16M 13/04

USPC ......................................................... 294/210
See application file for complete search history.

(56) References Cited

U.S. PATENT DOCUMENTS

| | | | | |
|---|---|---|---|---|
| 3,836,986 | A * | 9/1974 | Kawazoe .............. | F16M 11/16 396/419 |
| 4,662,771 | A * | 5/1987 | Roe ..................... | B05C 17/0205 403/322.2 |
| 5,421,549 | A * | 6/1995 | Richards .............. | F16M 11/10 396/419 |
| 5,454,473 | A * | 10/1995 | Hennessey ............... | A47F 5/04 211/85.6 |
| 6,283,421 | B1 * | 9/2001 | Eason .................... | F16M 11/28 248/188.7 |
| 8,733,712 | B2 * | 5/2014 | Xu ........................ | F16M 13/04 248/404 |
| 8,915,660 | B1 * | 12/2014 | Ben Yehuda .......... | F16M 11/38 396/428 |
| 9,658,518 | B2 * | 5/2017 | Nordhaug ............. | G03B 17/561 |
| 9,751,205 | B2 * | 9/2017 | Huang ................. | F16M 11/041 |

(Continued)

FOREIGN PATENT DOCUMENTS

GB          2578637 A *    5/2020   ............ F16M 11/24

*Primary Examiner* — Dean J Kramer

(57) ABSTRACT

The invention discloses a handle sliding structure and a selfie stick using the same, and belongs to the field of selfie sticks. The handle sliding structure comprises a long rod and a handle, wherein the handle is a cavity structure and is slidably arranged on the long rod, and the long rod can slide along the handle to retreat into or stretch out a cavity. When the selfie stick is used, the long rod can stretch out of the handle, and only the tail end of the long rod is connected to the handle, so that the length of the long rod is fully used; and when the selfie rod is not used, the long rod can partially retreat into the handle in the length direction, so that the portability is good.

9 Claims, 6 Drawing Sheets

(56) References Cited

U.S. PATENT DOCUMENTS

2013/0094196 A1* 4/2013 Wessel .................. F16M 11/10
362/198
2018/0066792 A1* 3/2018 Chen .................... F16M 11/041

* cited by examiner

HANDLE SLIDING STRUCTURE AND SELFIE STICK USING SAME

BACKGROUND OF THE INVENTION

1. Technical Field

The invention relates to the technical field of selfie sticks, in particular to a handle sliding structure and a selfie stick using the same.

2. Description of Related Art

Selfie sticks have become popular across the world and are indispensable equipment for travel. Existing selfie sticks have multiple functions. For example, an earlier application Patent No. 201620751825.1 is designed in the following manner: a telescopic structure is arranged on a long rod to improve the portability of the selfie stick; and a handle is designed into an extensible structure and can be used as a support frame of the selfie stick after being extended. However, the handle and the long rod of this selfie stick are fixedly connected, so that the position of the handle with respect to the selfie stick in the length direction cannot be changed; and to guarantee the portability, the tail end of the long rod retreats in the handle, so the length of the long rod cannot be fully used.

BRIEF SUMMARY OF THE INVENTION

The objective of the invention is to overcome the defects of the prior art by providing a handle sliding structure and a selfie stick using the same. A handle and a long rod of the selfie stick are slidably connected; when the selfie stick is used, the long rod can stretch out of the handle, and only the tail end of the long rod is connected to the handle, so that the length of the long rod is fully used; and when the selfie stick is not used, the long rod can partially retreat into the handle in the length direction, so that the portability is good.

To fulfill the aforesaid objective, the invention provides a handle sliding structure which comprises a long rod and a handle, wherein the handle is a cavity structure and is slidably arranged on the long rod, and the long rod is able to slide along the handle to retreat into or stretch out of a cavity.

The handle comprises a sliding sleeve and a holding part of the cavity structure, and the sliding sleeve is disposed around the long rod and has a tail end connected to the holding part.

Preferably, the holding part comprises a fixing seat and multiple support pieces rotatably connected to the fixing seat, and the sliding sleeve is connected to the fixing seat.

Preferably, a shell is arranged on the sliding sleeve.

Preferably, limiting parts are arranged at two ends of the long rod, and the handle slides between the two limiting parts; and specifically, a protruding part is arranged at one end of the long rod, and a limiting ring is arranged at the other end of the long rod, and the handle slides between the limiting ring and the protruding part.

Specifically, the handle is a cavity structure having an end formed with an opening, and when the handle slides with respect to the long rod, the limiting ring abuts against the bottom end of the handle.

Preferably, the sliding sleeve is a cylindrical structure with two open ends, and multiple concave parts are arranged on a side wall of the sliding sleeve and abut against the long rod.

Preferably, the long rod is formed with a strip-shaped slot in a length direction, the handle is provided with a convex structure, and the convex structure is matched with and clamped in the strip-shaped slot.

Preferably, the long rod comprises at least one hollow rod, inner diameters of the hollow rods are decreased gradually, and the hollow rods are sequentially sleeved with one another to form a telescopic structure; and the handle is slidably arranged on the hollow rod with the maximum diameter.

To fulfill the aforesaid objective, the invention further provides a selfie stick which comprises a mobile phone holder and the handle sliding structure, wherein the mobile phone holder is connected to the long rod.

The invention has the following beneficial effects: compared with the prior art, the handle sliding structure provided by the invention comprises a long rod and a handle; the handle is a cavity structure and is slidably arranged on the long rod, and the long rod can slide along the handle to retreat into or stretch out of a cavity; when the selfie stick is sued, the long rod can stretch out of the handle, and only the tail end of the long rod is connected to the handle, so that the length of the long rod is fully used; and when the selfie stick is not used, the long rod can partially retreat into the handle in the length direction, so that the portability is good.

REFERENCE SIGNS OF MAIN COMPONENTS

1, handle; 2, long rod; 3, mobile phone holder; 11, sliding sleeve; 12, fixing seat; 21, strip-shaped slot; 22, protruding part; 23, limiting ring; 13, support piece; 14, shell; 15, remote control; 111, convex structure; 112, concave part; 141, groove.

DETAILED DESCRIPTION OF THE INVENTION

For the sake of a clearer statement of the invention, the invention will be further described below in conjunction with the accompanying drawings.

Figure 1:
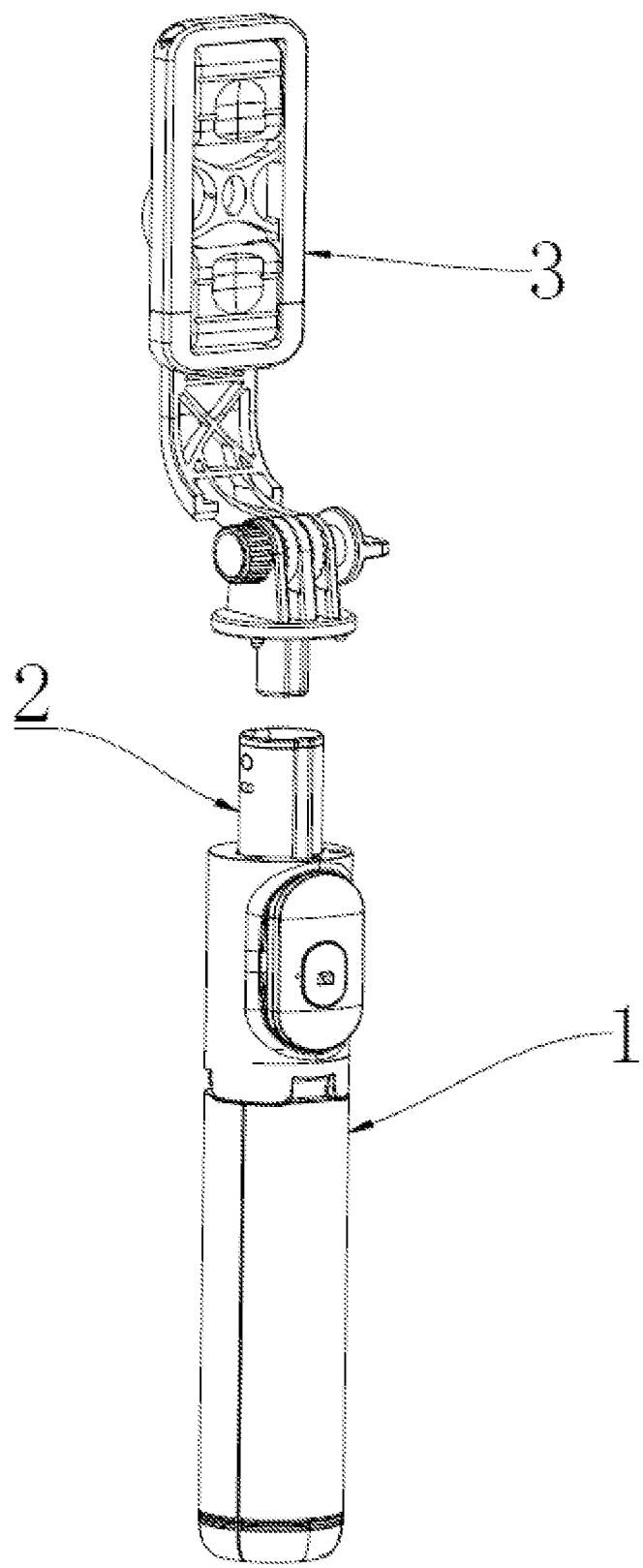
FIG. 1 is a structural view of a selfie stick according to the invention.
Figure 2:
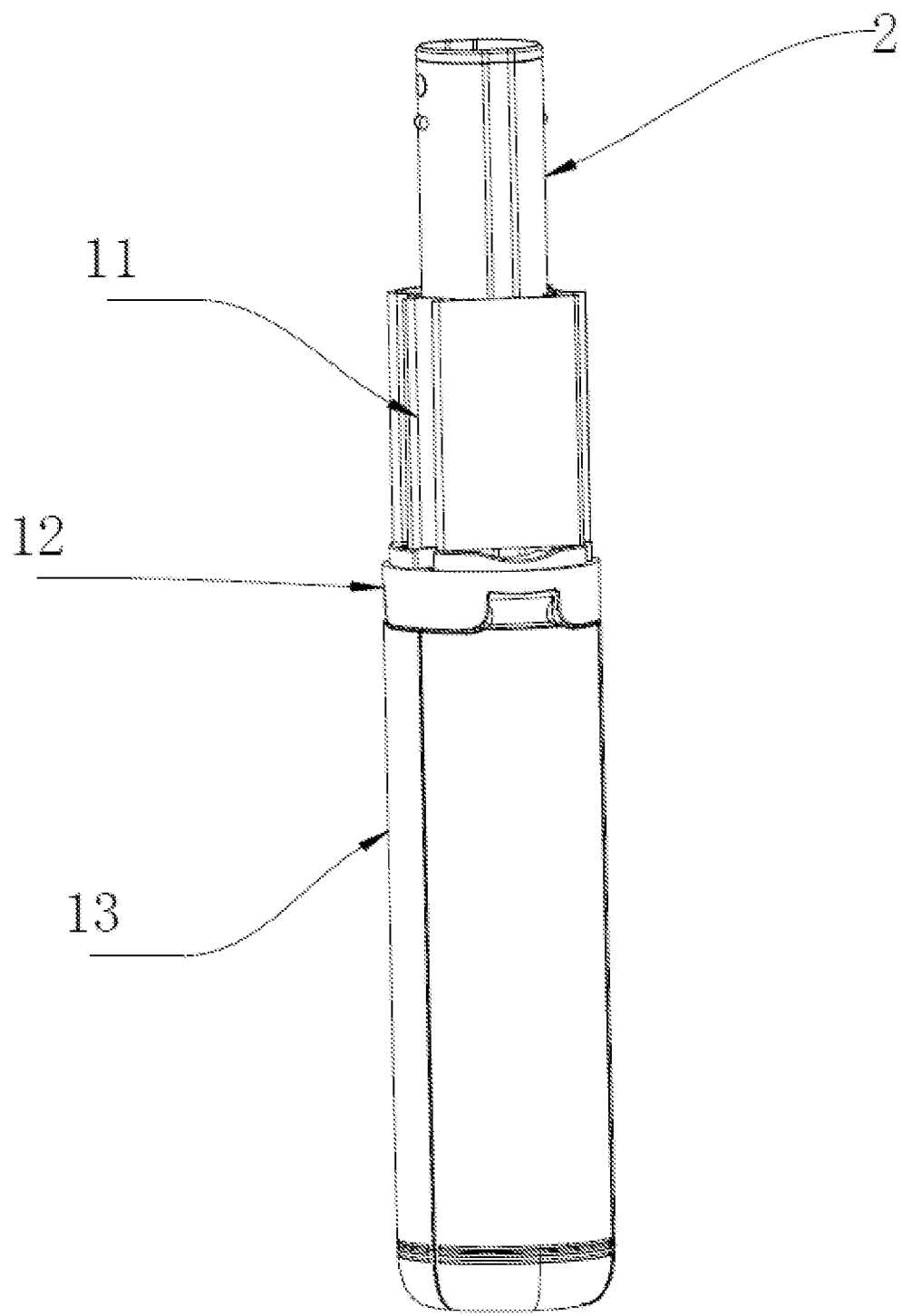
FIG. 2 is a structural view of the selfie stick provided with a sliding sleeve according to the invention.
Figure 3:
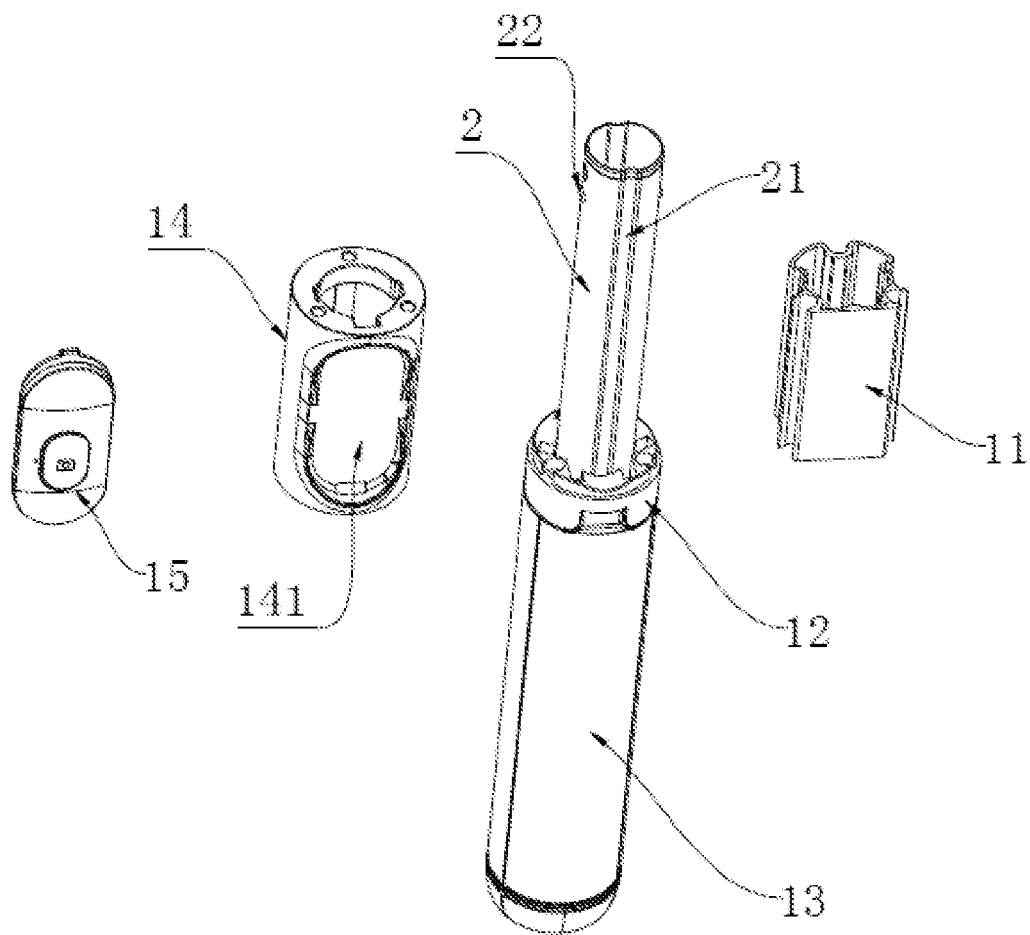
FIG. 3 is an exploded view of the selfie stick according to the invention.
Figure 4:
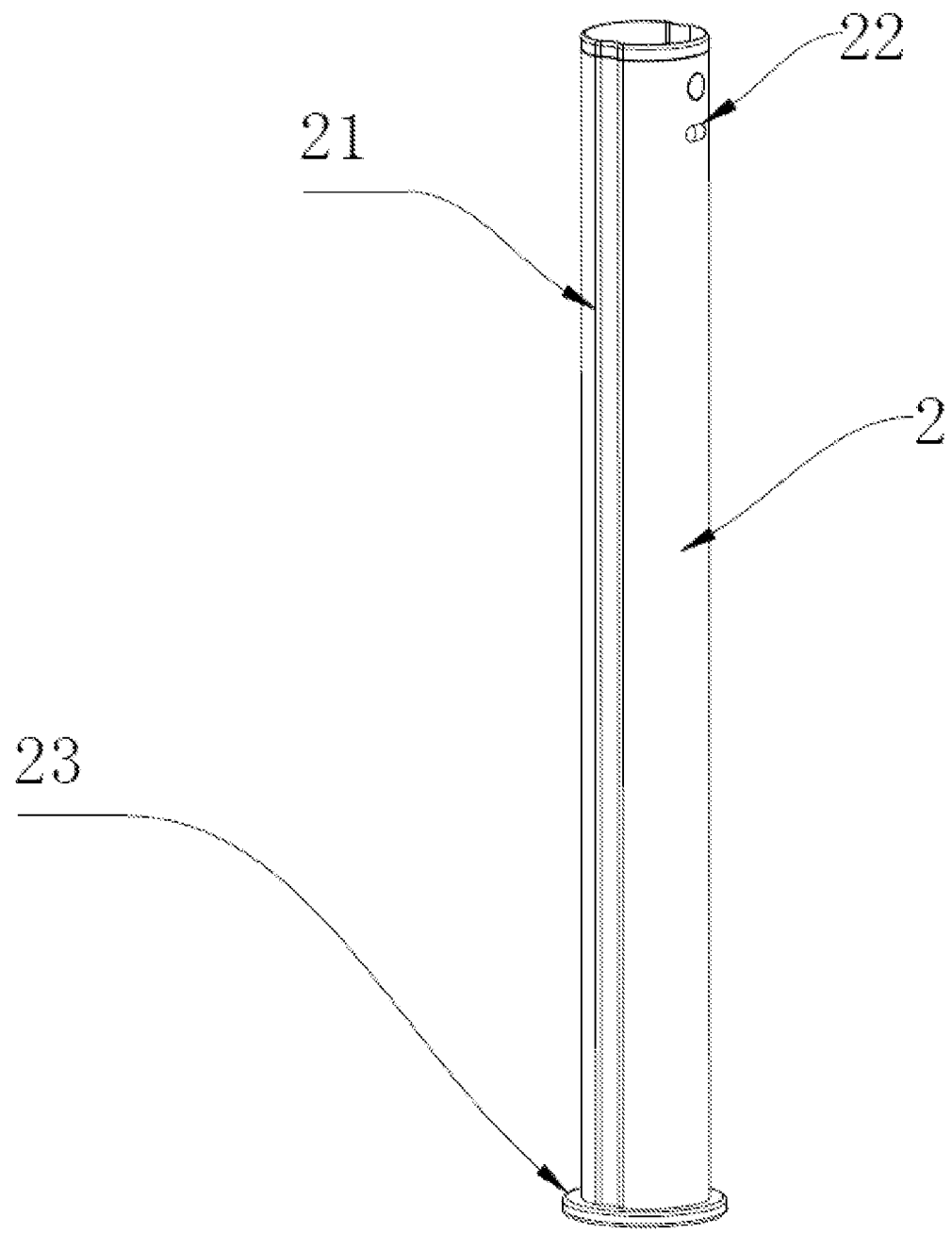
FIG. 4 is a structural view of a long rod according to the invention.
Figure 5:
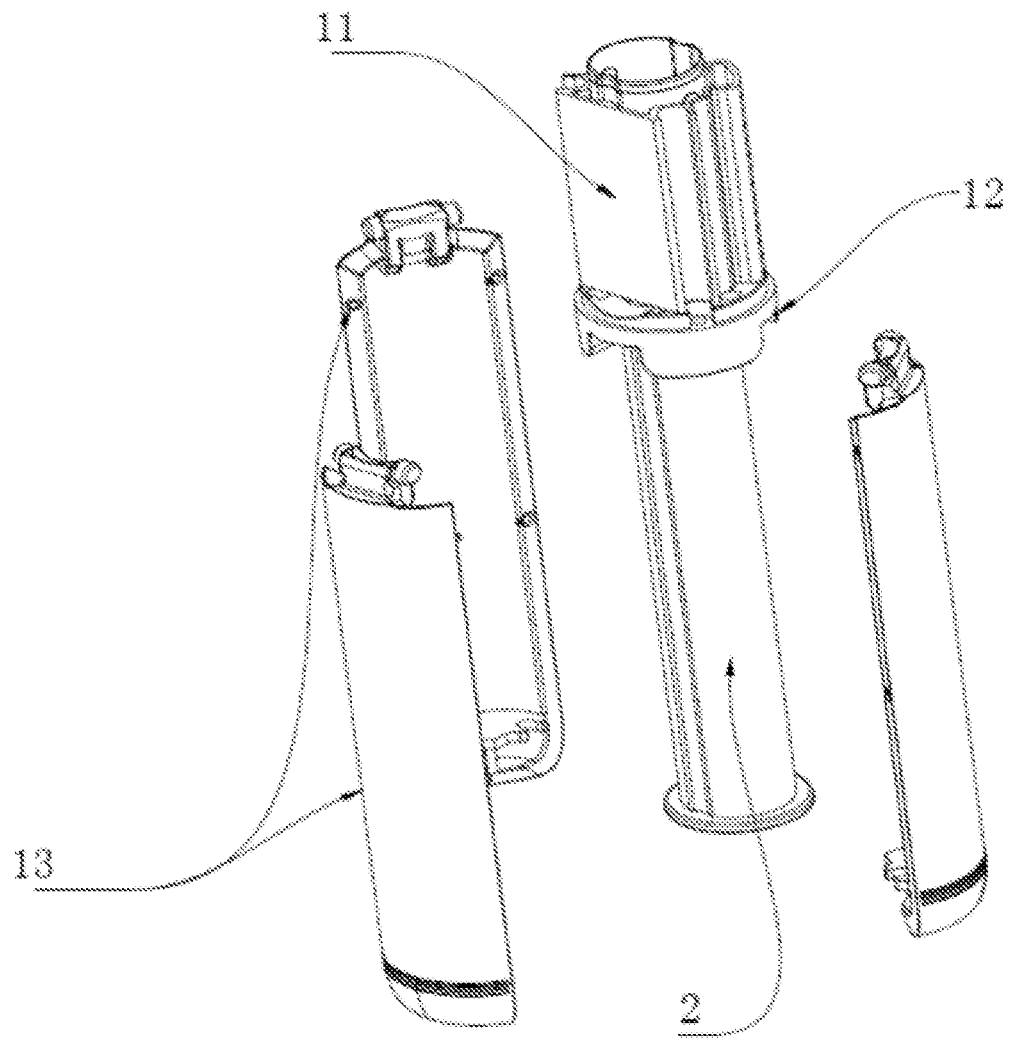
FIG. 5 is a structural view of a holding part according to the invention.
Figure 6:
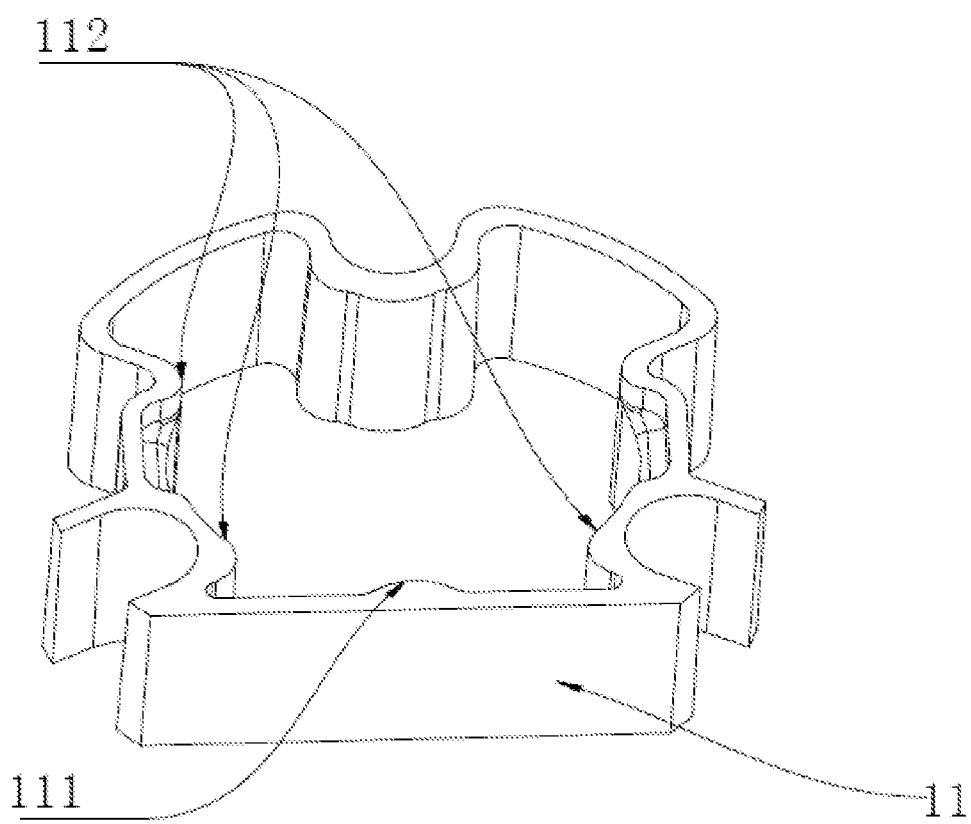
FIG. 6 is a structural view of a sliding sleeve according to the invention.

As mentioned in the description of the related art, the handle 1 and the long rod 2 of the existing selfie rod are fixedly connected, so it is impossible to make full use of the size of the long rod 2 and guarantee the portability of the long rod 2 at the same time. In view of this, the invention provides a handle 1 sliding structure which, as shown in FIG. 1, comprises a long rod 2 and a handle 1, wherein the handle 1 is a cavity structure and is slidably arranged on the long rod 2, and the long rod 2 is able to slide along the handle 1 to retreat into or stretch out of a cavity.

Compared with the prior art, the handle 1 is slidably arranged on the long rod 2; when the selfie stick is used, the long rod 2 is pulled out of the handle 1, so that the length of the long rod 2 is fully used; and when the selfie stick is not used, the long rod 2 can retreat into the handle 1 to be carried easily.

In this embodiment, the handle 1 is a cavity structure having an end formed with an opening, and the long rod 2 is inserted into the opening; and the diameter of the opening of the handle 1 and the diameter of the long rod 2 are set to ensure that the handle 1 can slide on the long rod 2 and can also be stabilized on the long rod 2, that is, the handle 1 will slide 1 when it is pushed by an external force.

Preferably, as shown in FIG. 2-FIG. 6, the handle 1 comprises a sliding sleeve 11 and a holding part of the cavity structure, wherein the sliding sleeve 11 is disposed around the long rod 2 and has a tail end connected to the holding part.

Due to the fact that the handle 1 is not only to be held by users, but also may be endowed with other functions, the structure of the handle 1 is very complicated; and to ensure that the diameter of the opening of the handle 1 matches the diameter of the long rod 2, the precision requirement for the size of the structure is high, the mold-opening difficulty is high, and the rejection rate of the handle 1 during the production process is high. So, the sliding sleeve 11 is separately arranged to be matched with the long rod 2; compared with the handle 1, the sliding sleeve 11 has a simper structure, so that mold-opening is easier; and the handle 1 and the sliding sleeve 11 are connected, so that the handle 1 can slide, the high precision requirement for the size is eliminated, and mold-opening is easier.

In this embodiment, the sliding sleeve 11 is made of a soft material, so that the sliding sleeve 11 can deform slightly to be matched with the long rod 2; when the sliding sleeve 11 is pulled upwards or downwards, a buffer effect can be realized to prevent the sliding sleeve 11 from falling all at once, and the sliding sleeve 11 will not be too difficult to pull. The sliding sleeve 11 is made of a soft material such as PP.

Preferably, a shell 14 is arranged on the sliding sleeve 11. Considering that the sliding sleeve 11 is mainly used to realize structural functions, the shell 14 is arranged outside the sliding sleeve 11 to shield the sliding sleeve 11. The shape of the shell 14 can be designed according to aesthetic requirements, so that the whole structure can fulfill corresponding functions and has an attractive appearance. Preferably, the shell 14 is detachably arranged outside the sliding sleeve 11.

In this embodiment, an external structure may be arranged on the shell 14 to realize additional functions of the shell 14. For example, a groove 141 is formed in the shell 14 to allow a remote control 15 for controlling selfie to be clamped therein.

In this embodiment, the shell 14 is made of a hard ABS material.

In this embodiment, the sliding sleeve 11 is a cylinder structure with two open ends, and one end of the cylindrical structure is connected to the holding part of the handle 1. Specifically, a mounting hole is formed in the holding part of the handle 1, and the sliding sleeve 11 is inserted into the mounting hole.

In this embodiment, multiple concave parts 112 are arranged on a side wall of the sliding sleeve 11 and abut against the long rod 2 to realize point contact or line contact. Specifically, the concave parts 112 are spaced apart from one another and are distributed around the central axis of the sliding sleeve 11. The sliding groove 11 around the long rod 2 applies a pressure to the long rod 2, so that the firmness of the sliding sleeve 11 and the long rod 2 is improved.

Preferably, the long rod 2 is formed with a strip-shaped slot 21 in a length direction, and the handle 1 is provided with a convex structure 111. The convex structure 111 is matched with and clamped in the strip-shaped slot 21 to restrain the handle 1 or the sliding sleeve 11 from rotating with respect to the long rod 2, which may other cause structural wear of the handle 1 or a sliding sleeve 11 support or excessive sliding due to unfirm connection of the handle 1 or the sliding sleeve 11 and the long rod 2.

Preferably, the holding part comprises a fixing seat 12 and multiple support pieces 13 rotatably connected to the fixing seat 12; the sliding sleeve 11 is connected to the fixing seat 12; the support pieces 13 form a tripod after being unfolded to ensure that the handle 1 can be stably placed on the ground or on a plane; after the support pieces 13 are folded, an accommodating cavity with an open end will be defined; the fixing seat 12 is arranged between the support frame and the sliding sleeve 11, so that the handle 1 can slide under the precondition that the original function of the handle 1 is not affected by the sliding structure.

Preferably, limiting parts are arranged at two ends of the long rod, respectively, and the handle slides between the two limiting parts. Specifically, a protruding part 22 is arranged at one end of the long rod 2, a limiting ring 23 is arranged at the other end of the long rod 2, and the handle 1 slides between the limiting ring 23 and the protruding part 22. In a specific solution, the handle 1 is a cavity structure having an end formed with an opening; when the handle 1 slides with respect to the long rod 2, the limiting ring 23 and the bottom end of the handle 1 abut against each other to limit the maximum length of the long rod 2 retreating into the handle 1, and the protruding part 22 and the sliding sleeve 11 are located at the connection end of the handle 1 or abut against the open end of the handle 1 to limit the maximum length of the long rod 2 stretching out of the handle 1. In this embodiment, the limiting ring 23 and the protruding part 22 can be exchanged in position or replaced with other structures with a limiting function.

Preferably, the long rod 2 comprises at least one hollow rod, inner diameters of the hollow rods are decreased gradually, and the hollow rods are sequentially sleeved with one another to form a telescopic structure; and the handle 1 or the sliding sleeve 11 is slidably arranged on the hollow rod with the maximum diameter. For example, the long rod 2 comprises multiple hollow rods which are sequentially sleeved with one another to form the telescopic structure, and a mobile phone holder 3 of a selfie stick is connected to the hollow rod with the minimum diameter.

To fulfill the aforesaid objective, the invention further provides a selfie stick which comprises a mobile phone holder 3 and the handle 1 sliding structure, wherein the mobile phone holder 3 is connected to the long rod 2.

To expand the rotation angle of the selfie stick, a rotary pan-tilt is arranged between the long rod 2 and the mobile phone holder 3; the rotary pan-tilt can drive the mobile phone holder 3 to rotate in two different directions, and the mobile phone 3 can automatically rotate in a third direction, so that full-angle rotation is realized during selfie.

Other common function settings of the selfie stick will not be detailed anymore here.

The invention has the following advantages:
 1. Compared with the prior art, the handle of the invention is a cavity structure and is slidably arranged on the long rod, and the long rod can slide along the handle to retreat into or stretch out of a cavity; when the selfie stick is used, the long rod can stretch out of the handle, and only the tail end of the long rod is connected to the handle, so that the length of the long rod is fully used; and when the selfie rod is not used, the long rod can partially retreat into the handle in the length direction, so that the portability is good.

2. The handle comprises the sliding sleeve and the holding part of the cavity structure, and the sliding sleeve is disposed around the long rod and has the tail end connected to the holding part; compared with the handle, the sliding sleeve has a simpler structure, so that mold-opening is easier; and the handle is connected to the sliding sleeve, so that the handle can slide, and high precision requirements for the size are eliminated.

3. The long rod is formed with the strip-shaped slot in the length direction, the handle is provided with the convex structure, and the convex structure is matched with and clamped in the strip-shaped slot, so that the handle or the sliding sleeve is restrained from rotating with respect to the long rod, which may otherwise cause structural wear of the handle or the sliding sleeve support.

The embodiments disclosed above are merely several specific ones of the invention, and are not intended to the invention. All transformations made by any skilled in the art should also fall within the protection scope of the invention.

What is claimed is:

1. A handle sliding structure, comprising a long rod and a handle, wherein the handle is a cavity structure and is slidably arranged on the long rod, and the long rod is able to slide along the handle to retreat into or stretch out of a cavity; and
wherein the handle comprises a sliding sleeve and a holding part of the cavity structure; a shell is arranged on the sliding sleeve;
the holding part is disposed around one end of the long rod, and the sliding sleeve is disposed around the long rod and is located between the holding part and another end of the long rod.

2. The handle sliding structure according to claim 1, wherein the holding part comprises a fixing seat and multiple support pieces rotatably connected to the fixing seat, and the fixing seat is disposed around one end of the long rod.

3. The handle sliding structure according to claim 1, wherein limiting parts are arranged at the two ends of the long rod, respectively, and the handle slides between the two limiting parts.

4. The handle sliding structure according to claim 3, wherein the handle is a cavity structure having an end formed with an opening, and when the handle slides with respect to the long rod, a limiting ring abuts against a bottom end of the handle.

5. The handle sliding structure according to claim 1, wherein the sliding sleeve is a cylindrical structure with two open ends, and multiple concave parts are arranged on a side wall of the sliding sleeve and abut against the long rod.

6. The handle sliding structure according to claim 1, wherein the long rod is formed with a strip-shaped slot in a length direction, the handle is provided with a convex structure, and the convex structure is matched with and clamped in the strip-shaped slot.

7. A selfie stick, comprising a mobile phone holder and the handle sliding structure according to claim 1, wherein the mobile phone holder is connected to the long rod.

8. A handle sliding structure, comprising a long rod and a handle, wherein the handle is a cavity structure and is slidably arranged on the long rod, and the long rod is able to slide along the handle to retreat into or stretch out of a cavity;
wherein limiting parts are arranged at the two ends of the long rod, respectively, and the handle slides between the two limiting parts; the handle is a cavity structure having an end formed with an opening, and when the handle slides with respect to the long rod, a limiting ring abuts against a bottom end of the handle.

9. A handle sliding structure, comprising a long rod and a handle, wherein the handle is a cavity structure and is slidably arranged on the long rod, and the long rod is able to slide along the handle to retreat into or stretch out of a cavity;
the handle comprises a sliding sleeve and a holding part of the cavity structure; the sliding sleeve is a cylindrical structure with two open ends, and multiple concave parts are arranged on a side wall of the sliding sleeve and abut against the long rod.

* * * * *